US006993124B2

(12) United States Patent
Hettish

(10) Patent No.: US 6,993,124 B2
(45) Date of Patent: Jan. 31, 2006

(54) CONTROL INTERFACE FOR LINKING A COMPUTER SUPPORTED TELEPHONY APPLICATION WITH A PBX SWITCH UTILIZING CSTA PROTOCOLS

(75) Inventor: Mark Bernard Hettish, Cary, NC (US)

(73) Assignee: Siemens Communications, Inc., Boca Raton, FL (US)

(*) Notice: Subject to any disclaimer, the term of this patent is extended or adjusted under 35 U.S.C. 154(b) by 532 days.

(21) Appl. No.: 09/864,009

(22) Filed: May 23, 2001

(65) Prior Publication Data

US 2002/0186830 A1 Dec. 12, 2002

(51) Int. Cl.
*H04M 7/00* (2006.01)

(52) U.S. Cl. .................. 379/231; 379/9.03; 379/15.01; 379/229

(58) Field of Classification Search ................ 379/229, 379/265.09, 15.01, 9.03, 231
See application file for complete search history.

(56) References Cited

U.S. PATENT DOCUMENTS 4,805,209 A * 2/1989 Baker et al. ............. 379/93.23
4,972,453 A * 11/1990 Daniel et al. .............. 379/9.03
5,007,080 A 4/1991 MacMillan et al. ......... 379/269
5,631,954 A * 5/1997 Evans et al. ................ 370/271
5,734,705 A * 3/1998 Schlossman et al. ....... 379/117
5,793,771 A 8/1998 Darland et al. ............. 370/467
5,999,593 A * 12/1999 Krawiec et al. ......... 379/15.01
6,049,603 A * 4/2000 Schwartz et al. ........... 379/309
6,094,479 A * 7/2000 Lindeberg et al. ..... 379/220.01
6,192,121 B1 2/2001 Atkinson et al. ........... 379/265
6,275,230 B1 * 8/2001 Ingrassia et al. ............ 715/700

FOREIGN PATENT DOCUMENTS

WO WO 00/18092 3/2000

OTHER PUBLICATIONS

"Computer Telephony Integration and Java", Brockbank et al., British Telecommunications Engineering, vol. 17, Apr. 1998, pp. 10-17.

* cited by examiner

*Primary Examiner*—Ahmad F. Matar
*Assistant Examiner*—Rasha S. AL-Aubaidi

(57) ABSTRACT

A control interface for linking a computer supported telephony application with a PBX switch utilizing CSTA protocols utilizes ActiveX properties, methods, events, and pages to access all of the events and services provided by the CSTA protocols. Common paradigms such as Invoke_ID and timers are built in to the interface. The interface further provides statistics and diagnostics via property pages.

20 Claims, 2 Drawing Sheets

Figure 1: Platform Architecture
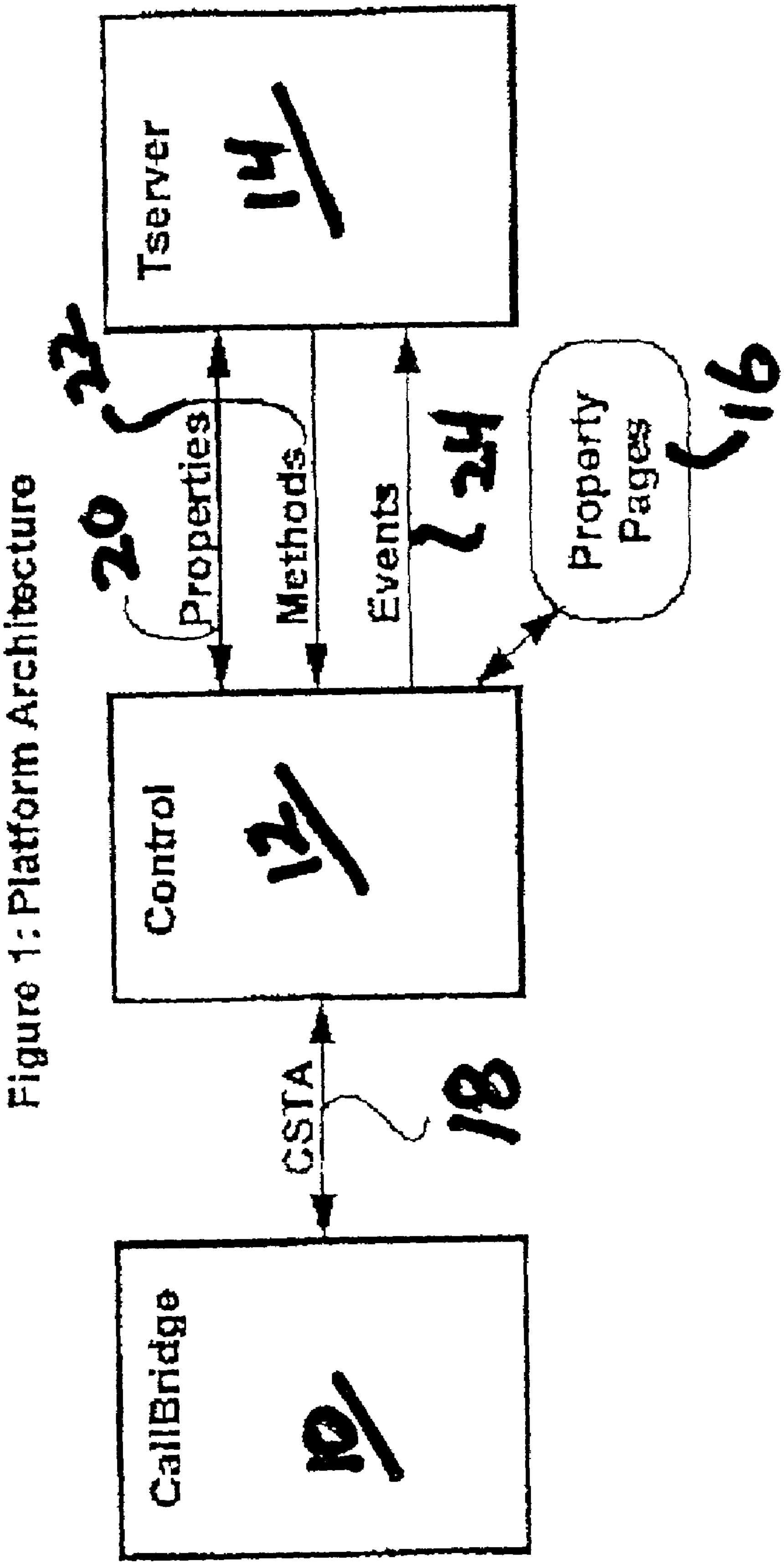

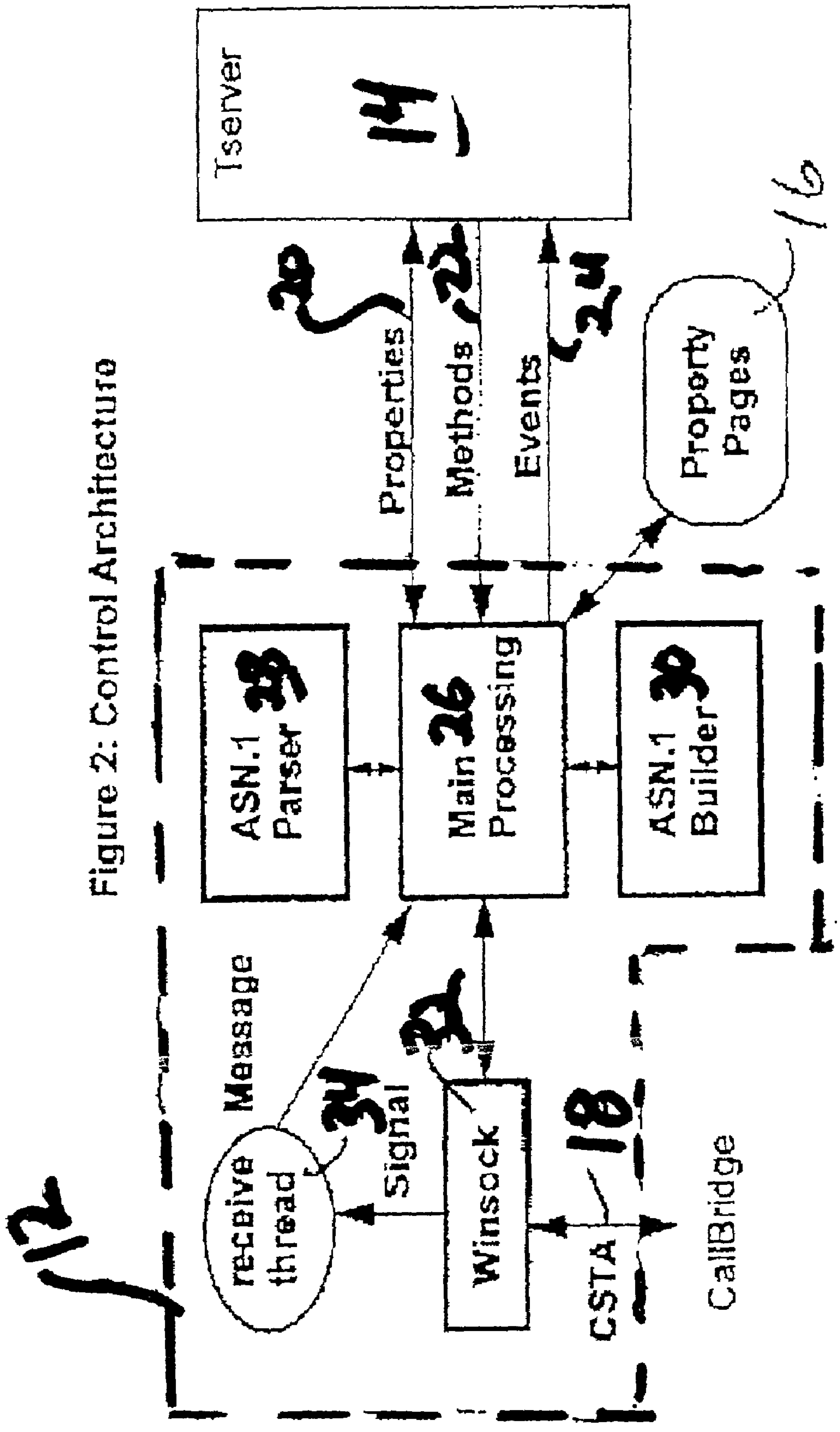
Figure 2: Control Architecture

CONTROL INTERFACE FOR LINKING A COMPUTER SUPPORTED TELEPHONY APPLICATION WITH A PBX SWITCH UTILIZING CSTA PROTOCOLS

BACKGROUND OF THE INVENTION

1. Field of the Invention

The invention relates to methods and apparatus for implementing computer supported telephony applications. More particularly, the invention relates to a control interface for linking a computer supported telephony application with a PBX switch utilizing CSTA protocols.

2. Brief Description of the Prior Art

It is well known in the art to couple a computer to a PBX switch in order to provide enhanced telephony services. Such services include voice mail, fax on demand, text to speech email retrieval, call forwarding, interactive voice response systems, etc. Most of these applications are built around the CSTA standard which is a standard for the protocols used across the link between a computer and a PBX switch. The CSTA standard protocols utilize ASN.1, Abstract Syntax Notation number One, an international standard for specifying data used in communication protocols. Although ASN.1 is powerful, it is a complex language. The CSTA standard has been implemented in various proprietary PBX-Computer interfaces such as the "Call Bridge for Work Groups" which is the interface used in the Siemens Hicom 300 PBX.

Although the CSTA has made the development of telephony application somewhat uniform, the protocols provided by the CSTA are relatively low level. Even with the "Call Bridge for Work Groups" interface, a telephony application must take responsibility for many low level functions of the interface. For example, even using the "Call Bridge for Work Groups" interface, an application must take responsibility for creating, maintaining, and tearing down a TCP/IP socket connections; building and parsing the ASN.1 encoded CSTA stream; handling the reception system status heartbeat messages; sending and handling the result of System Status heartbeat messages; and managing the generation and timing of invoke Ids. In addition, many applications would also want to add diagnostic user interface features to indicate status, statistics and errors as they pertain to a particular connection. All of these functions must be implemented by the application. Many of these, such as the ASN.1 builder/parser are time-consuming and/or costly to develop/purchase.

It is known in the art to provide a higher level interface to some of the "Call Bridge for Work Groups"—CSTA interface. An earlier Siemens product provided limited ActiveX support for the following CSTA Services: Monitor Start, Monitor Stop; Divert Call, System Status Filter; and the following CSTA Events: connected, conferenced, connection cleared, delivered, diverted, established, held, agent logged off, agent logged on, network reached, agent not ready, queued, agent ready, retrieved, service initiated, transferred, agent work not ready, agent work ready, call info, system status, and universal failure error. However, there have not been any full high level interfaces addressing all of the features and events of the "Call Bridge for Work Groups"—CSTA interface. Moreover, there have not been any high level interface which aid in creation of common paradigms used in telephony applications. Furthermore, there have not been any high level interfaces which aid in the provision of diagnostic functions in telephony applications.

SUMMARY OF THE INVENTION

It is therefore an object of the invention to provide a high level control interface to CSTA protocols.

It is also an object of the invention to provide a control interface which significantly reduces the development time and effort for creating telephony applications which interface with CSTA protocols.

It is another object of the invention to provide a control interface which may be bypassed if the developer chooses to work directly with CSTA for certain functions.

It is yet another object of the invention to provide a control interface based on an industry standard language which is easily incorporated into many different programming environments.

It is another object of the invention to provide a control interface which frees the programmer from detailed knowledge of ASN.1.

It is still another object of the invention to provide a control interface which is easily configurable.

It is another object of the invention to provide a control interface which facilitates the easy creation of user interfaces.

It is still another object of the invention to provide a control interface which provides easy to use diagnostic interfaces.

In accord with these objects which will be discussed in detail below, the control interface according to the invention utilizes component based interface objects such as Microsoft ActiveX or Sun Microsystems JavaBeans to provide a high level interface to all of the "Call Bridge for Work Groups"—CSTA protocols. The presently preferred embodiment of the invention utilizes ActiveX. ActiveX controls generally include properties, methods, and events. According to the invention, the properties interface is used to set and get configuration values; the methods interface is used to initialize and shut down the control interface as well as to send CSTA messages to the control interface; and the events interface is used to transfer asynchronous data including CSTA events, data within events, CSTA responses, system status CSTA requests, and other control notifications. Property pages are also provided for implementing user interfaces and diagnostics. The control interface permits the automatic generation of common paradigms including: invoke ID generation, invoke ID timing, send heartbeat messages, and reply to heartbeat messages.

The control interface maintains a rich set of statistics including messages/sec, number of requests, number of responses, number of events, number of errors and number or rejects. All are tabulated on the incoming and outgoing link and all are displayable via a property page. Statuses are also displayable via a property page. Errors are logged internally by the control interface and can be displayed via a property page. Moreover, the control interface provides an ActiveX method by which applications can log error information including application defined error strings that are displayable via a property page.

BRIEF DESCRIPTION OF THE DRAWINGS

FIG. 1 is a high level block diagram of the platform architecture according to the invention including, the Call Bridge—CSTA interface of a PBX switch, the control interface of the invention, and an application generically referred to as a Tserver; and FIG. 2 is a high level block diagram of the control architecture of the invention illustrating the flow of data between the control interface of the invention and the Call Bridge—CSTA interface of a PBX switch.

DETAILED DESCRIPTION

Turning now to FIG. 1, a platform architecture according to the invention includes the Call Bridge interface 10 of a PBX switch, the control interface 12, and a telephony application 14 referred to herein as Tserver.

As mentioned above, the control interface 12 is preferably an ActiveX control that provides property, method and event interfaces to the application 14 on one side and a CSTA interface to Call Bridge 12 on the other side. In addition, property pages 16 are preferably provided to support such items as configuration, status and statistics viewing and error viewing as described in more detail below.

The control interface 12 communicates with the Call Bridge 10 using the CSTA protocol via a TCP/IP based socket connection 18. As an ActiveX control, the control interface 12 provides three interfaces to the Tserver 14. These interfaces include the properties interface 20, the methods interface 22, and the events interface 24. The properties interface 20 is used to set and get configuration values. The methods interface 22 is used to initialize the control interface 12, shutdown the control interface 12 and to send CSTA messages to the control interface 12. The events interface 24 is used by the control interface 12 to send asynchronous data to the Tserver 14. These data include CSTA events (including data within the events), CSTA responses, the System Status CSTA request and any other notifications that the control interface 12 needs to send. Property pages 16 are provided and can be activated by the Tserver application via the appropriate method calls.

Referring now to FIG. 2,the internal architecture of the control interface 12 is shown surrounded by phantom lines. The main processing component 26 handles any set and get property requests 20. It also handles methods 22, those related to initialization and shutdown as well as those related to sending CSTA services. Where needed it will use the ASN.1 parser 28 and builder 30 to receive and send CSTA messages from/to the Call Bridge CSTA interface. According to the presently preferred embodiment, the Main Processing 26 and ASN.1 components 28, 30 are implemented as part of the main thread of an ActiveX dynamically linked library (DLL).

As illustrated in FIG. 2, all communications between the Call Bridge CSTA interface 18 and the main processing 26 is via the Winsock DLL 32. A socket connection is established upon which ASN.1 encoded CSTA messages are sent and received to and from the Call Bridge CSTA interface. According to the invention, a receive thread 34 will wait on the socket for a signal that indicates an incoming ASN.1 encoded CSTA message. When such a message is received, the receive thread 34 will post a message to the main thread and control is passed to the main thread. The main thread reads the CSTA message from the socket. The message is then parsed by the ASN.1 parser component 28. Data from the parsed message is then sent to the Tserver 14 along with the notification of the arrival of the message. This is preferably accomplished in a single event call.

According to the presently preferred embodiment, the ASN.1 builder and parser components utilize the same Open Source Solutions (OSS components) as the Call Bridge CSTA interface.

The control interface is preferably based on the MFC environment, utilizes an InprocServer32 type of ActiveX control, and supports the ActiveX apartment threading model. It will be appreciated that MFC based ActiveX controls must fire events from the main thread. This requirement is the reason the receive thread 34 merely posts a message to the main thread 26 instead of handling the parsing of the message and the firing of the event itself.

The control interface according to the invention is preferably implemented with the Microsoft Developer studio through which a library of C-language files a re compiled. The following discussion includes a description of the various, properties, methods, events, and pages defined by the invention to implement the control interface.

Properties

The following are the major properties are used by the present invention: Call Bridge CSTA Port Number, Call Bridge CSTA Server Name, Control ID, and Error logging.

The port number is a numeric representation of the Call Bridge CSTA port to which the control interface connects. The server name is a string that contains the host file name of the Call Bridge CSTA server. This scheme requires that an entry be made in the host file that contains the Call Bridge CSTA server name and its associated IP address.

If the Tserver allows server name entry then the person running the application must know the Call Bridge CSTA server name. If the Tserver application does not allow server name entry then whatever hard coded value it uses must be the name that is used in the host file.

The Control ID is a string that identifies the type of the control interface. For this control interface, the string is CallBridge CSTA for Tservers and is read-only.

The error logging property is a Boolean value that indicates whether or not the control interface should send internal error events to the application. These events are used to allow for debugging of the control interface. The default value of this property signifies that events should not be sent to the application.

The control interface provides two methods for managing the control: one to initialize the connection and one to tear down the connection.

ControlOpenConnection( )
calls to FireControlConnectionOpen( ) and
ControlCloseConnection( ) calls to
FireControlConnectionClosed( ).

In order to allow applications to differentiate between versions of the invention a new version property is used. The code for this property is similar to that of the Control ID Property with a BSTR value of the format <major version>.<minor version>.

According to the invention an option is provided for the control interface to send system status heartbeats to Callbridge CSTA and track the system status responses. This option is controlled via a new property, the heartbeat property.

The Heartbeat property is similar to the Error Logging property, and includes a Boolean flag that enables or disables the heartbeat. The default is disabled. This property is persistent.

The heartbeat implementation performs the following actions when enabled. After 30 seconds of inactivity on the incoming link it sends a System Status Enabled to Callbridge CSTA. If the reply comes within 10 seconds then it starts the inactivity timer again. If the reply does not come within 10 seconds then it sends the FireControlLinkClosed( ) event. Timers 1 and 2 are reserved for heartbeat timer usage.

The present invention supports timed requests. If a response does not come back within a certain period of time an event will be fired indicating this condition. Timed requests are implemented as properties. These properties allow the user to enable request timing and to set the number of seconds that the control is to wait before deeming that a response has been lost. The first property enables or disables the timing of requests. The second property assigns the time to wait for a response. This property will accept values from 10 seconds to 60 seconds. The maximum of 60 seconds is partially determined by the implementation, system timers can only accept up to a maximum of 64 seconds. The lower threshold of 10 is to avoid values that can easily cause necessary timeouts under certain load conditions. Each of these properties is persistent.

The internal invoke ID manager returns invoke IDs in the range of 100 to 0×FFFF (the UINT maximum). This value is then directly used as the timer ID for the SetTimer( ) routine. Timer values 1–99 are reserved for possible future timer usages within the control interface.

When a request is about to be sent, a timer is started with a timer ID equal to the invoke ID. The period of the timer is set from the Timed Requests property value. When a response, error, or reject is received, the parsed invoke ID (which equals the timer ID) is passed to the KillTimer( ) routine and no action is taken. If a timer times out, a message is sent to the WindowProc( ) with one of the parameters containing the timer ID (invoke ID). In this situation, KillTimer( ) is called to free the timer and an event is sent that contains the invoke ID. The event that will be used is FireUniversalError( ) with a class of performance_errors and a value of performanceLimitExceeded.

Methods

The control interface supplies methods for CSTA service support as well as other peripheral support needed.

It supports CSTA services via the following methods. All methods return the Invoke ID of the request if they complete without any errors. Any negative value indicates an error condition.

MonitorStart( )
MonitorStop( )
DivertCall( ), includes divert type and private user data parameter
SystemStatus( ), includes cause parameter
AlternateCall( ), includes device ID to toggle, current call ID, and held call ID
AnswerCall( ), includes answering call ID and answering device ID
ChangeMonitorFilter( ), includes xref id, call filter, agent filter, feature filter, and maintenance filter
ClearConnection( ), includes call ID to clear, device ID to clear
ConferenceCall( ), includes held call ID, held device ID, active call ID, and active device ID
ConsultationCall( ), includes held call ID, held device ID, called device ID, private user-user data length, and private user-user data
GenerateDigits, includes calling device ID and digits
HoldCall( ), includes call ID and device ID
MakeCall( ), includes originating device ID, called device ID, and auto-answer mode
ReconnectCall( ), includes cleared call ID, cleared device ID, retrieved call ID, and retrieved device ID
RetrieveCall( ), includes call ID and device ID
RouteTrigger( ), includes device ID and trigger
RouteSelect( ), includes xref ID and device ID
RejectCall( ), includes xref ID
RouteEnd( ), includes xref ID
SingleStepTransfer( ), includes active call ID, active device ID, transfer to device ID, private user-user data length, and private user-user data
SnapshotDevice( ), includes device ID
TransferCall( ), includes held call ID, held device ID, active call ID, active device ID According to the presently preferred embodiment, query device requests are handled via separate methods, one for each type of query as listed below.

QueryDeviceDoNotDisturb( ), includes device ID
QueryDeviceFowarding( ), includes device ID
QueryDeviceDeviceInfo( ), includes device ID
QueryDeviceAgentState( ), includes device ID According to the presently preferred embodiment, set feature requests are handled via separate methods, one for each type of feature as listed below.

SetFeatureGroupAgent( ), includes device ID and state
SetFeatureDoNotDisturb( ), includes device ID and state
SetFeatureForwarding( ), includes device ID, type, forwarding DN, private type, private DN, and private system forwarding type
SetFeatureAgentState( ), includes device ID, state, and group Several services support optional parameters. According to the presently preferred embodiment of the invention, the parameters are handled in the following manner.

call ID—For any service that supports an optional call ID, the application should pass the value LONG −1 to indicate that the call ID is not present.
user-user data—For any service that supports user-user data a length parameter will also be provided. A 0 length parameter indicates that the user-user data is not present.
auto answer flag—This parameter is required on the make call request.
filter—The optional filter parameter of the monitor start request is not exposed to the application. The application should use change monitor filter in order to change this value.

The invention provides some unique parameter types for services as described below.

user-user data—This field is thought of as a data byte stream. However, data byte streams are not easily passed between the application and Active-X controls. For this reason it is required that the application store the user-user data into a string (type BSTR in the control definition). The control interface treats it not as a string but as a byte array of data that is as long as the accompanying length that the application has passed in.
device IDs—If a device ID is a dialable number it is passed in as the ASCII representation of that dialable number. If a device ID is a device number it is passed in as the '#' followed by the ASCII representation of the device number.

The invention supports the following new service responses: SystemStatusResponse( ) which includes invoke ID.

The invention supports the following additional methods which are used to enable and disable the filtering of System Status requests that are received from Callbridge.

ControlSystemStatusFilterStart( )
ControlSystemStatusFilterStop( )

The invention supports the following additional methods which are used to connect to and disconnect from the Callbridge gateway.

ControlOpenConnection( )
ControlCloseConnection( )

The invention also provides a new method which is used to enable an application to log errors. Application generated errors are logged in the control error log and displayable with the control error log viewer.

ControlLogError( ), parameters include an error number, error code, information string, file name and line number Events The invention supports ActiveX events to handle CSTA events, CSTA services, CSTA responses and other control related events. The CSTA events are supported via the following ActiveX events. All events pass back the cross-reference ID.

FireCallInformation( ), includes call ID, device ID, invoking device ID, account info length, and account info FireConferenced( ), includes subject device ID, added device ID, primary call ID, primary device ID, secondary call ID, secondary device ID, conference ID list, local connection state, cause, private immediate connect to agent flag, and private cause FireConnectionCleared( ), includes dropped call ID, dropped device ID, releasing device ID, local connection state, and cause FireDelivered( ), includes call ID, device ID, alerting device ID, calling device ID, called device ID, last redirect device ID, private held device ID, local connect ion state, cause, private ANI flag, private user-user data length, private user-user data, private trunk, and private ACD DN FireDiverted( ), includes diverted call ID, diverted device ID, diverting device ID, destination device ID, local connection state, and cause FireEstablished( ), includes answered call ID, answered device ID, answering device ID, calling device ID, called device ID, last redirect device ID, private held call ID, local connection state, and cause FireHeld( ), includes held call ID, held device ID, holding device ID, local connection state, cause, and private cause FireNetworkReached( ), includes call ID, device ID, trunk, called device ID, local connection state, and cause FireQueued( ), includes queued call ID, queued device ID, queue device ID, calling device ID, called device ID, last redirect device ID, private held device ID, local connection state, and cause FireRetrieved( ), includes retrieved call ID, retrieved device ID, retrieving device ID, local connection state, and cause FireServiceInitiated( ), includes new call ID, new device ID, requested device ID, and local connection state FireTransferred( ), includes primary old call ID, primary old device ID, secondary old call ID, secondary old device ID, transferring device ID, transferred-to device ID, new call ID, new device ID, local connection state, cause, private cause, private user-user data length, and private user-user data FireAgentLoggedOn( ), includes agent device ID, agent ID, and group ID FireAgentLoggedOff( ), includes agent device ID, agent ID, and group ID FireAgentReady( ), includes agent FireAgentNotReady( ), includes agent device ID FireAgentWorkNotReady( ), includes agent device ID FireDoNotDisturb( ), includes device ID and state FireFailed( ), includes call ID, device ID, called device ID, local connection state, and cause FireForwarding( )—device ID, forward type, forward DN, private forward type, private forward DN FireOriginated( )—originating call ID, originating device ID, called device ID, local connection state, cause Several events support optional parameters. These parameters are handled in the following manner.

Local connection state—The value SHORT −1 is returned if this optional field is not present.

cause—The value SHORT −1 is returned if this optional held is not present.

private cause—The value SHORT −1 is returned if this optional field is not present.

immediate connect to agent flag—This field supports three values: SHORT 0 indicates a FALSE condition, SHORT 1 indicates a TRUE condition, and SHORT −1 indicates a not present condition.

ANI flag—This field supports three values: SHORT 0 indicates a FALSE condition, SHORT 1 indicates a TRUE condition, and SHORT −1 indicates a not present condition.

trunk number—The value LONG −1 is returned if this optional held is not present.

private forwarding type—This field supports three values: SHORT 0 indicates a FALSE condition, SHORT 1 indicates a TRUE condition, and SHORT −1 indicates a not present condition.

private forwarding DN—The value " " (a NULL string) is returned if this optional field is not present.

ACD DN—The value " " (a NULL string) is returned if this optional field is not present.

device IDs—In any instance where the dialable number or device number is not present the value " " (a NULL string) is returned.

The invention provides the following unique parameters for events.

user-user data—This is the same as the parameter described above with regard to services.

conference list—This parameter is encoded in the following format: <ASCII call ID>,<ASCII device ID>/<ASCII call ID>,<ASCII device ID>/ . . .

device IDs—If a device ID is a dialable number it is returned as the ASCII representation of that dialable number. If a device ID is a device number it is returned as the '#' followed by the ASCII representation of the device number.

The invention supports control events via the following ActiveX events.

The following events are used to indicate System Status filtering conditions.

FireControlFilterStartResult( )

FireControlFilterStopResult( )

The following events are used to indicate the status of the connection to Callbridge.

FireControlConnectionOpen( )

FireControlConnectionClosed( )

The invention supports the receiving of the following CSTA services from Callbridge CSTA. These services are supported via the following ActiveX events.

FireSystemStatusService, includes invoke ID, and type

FireRouteEndService( ), includes xref ID, and private cause

RouteRequestService( ), includes xref ID, called device ID, calling device ID, routed call ID, and routed device ID ReRouteRequestService( ), includes xref ID The invention supports CSTA responses via the following ActiveX events. All results return the invoke ID.

FireSystemStatusReqResult( )

FireMonitorStartResult( ), includes call filter, agent filter, feature filter, and maintenance filter FireMonitorStopResult( )

FireDivertCallResult( )

FireUniversalError( ), passes back the class and value values instead of just a single error code. The Invoke ID is also passed back.

FireReject( ), passes back the class and value values instead of just a single error code. The Invoke ID is also passed back.

FireAlternateCallResult( )

FireAnswerCallResult( )

FirechangeMonitorFiiterResult( ), includes call filter, agent filter, feature filter, and maintenance filter FireClearConnectionResult( )

FireConferenceCallResult( ), includes new call ID and new device ID

FireConsultationCallResult( ), includes new call ID and new device ID

FireGenerateDigitsResult( )

FireHoldCallResult( )

FireMakeCallResult( ), includes new call ID and new device ID

FireQueryDoNotDisturbResult( ), includes state

FireQueryFowardingResult( ), includes type count, type list, DN list, private type count, private type list, and private DN list FireQueryDeviceInfoResult( ), includes device ID, type, private type, private sub-type, private attribute, and calls queued FireQueryAgentStateResult( ), includes state, agent ID, group FireReconnectCallResult( )

FireRetrieveCallResult( )

FireSetFeatGroupAgentResult( )

FireSetFeatDNDResult( )

FireSetFeatFwdResult( )

FireSetFeatAgentStateResult( )

FireSingleStepXferStateResult( ), includes transferred call ID and transferred device ID FireSnapshotDeviceResult( ), includes call ID 1 through call ID 5 and local connection state 1 through local connection state 5

FireSystemStatusResult( )

FireTransferCallResult( ), includes new call ID and new device ID

The invention provides the following unique parameters for responses.

DN lists—The query device forwarding response may contain two DN lists, one for each forwarding type present and one for each private forwarding type present. The DN list format is the ASCII equivalent of the device ID separated by commas with each double entry followed by a single slash: <ASCII device ID>/<ASCII device ID>/ . . .

type lists—The query device forwarding response may contain up to 20 different forwarding types. Normally these would be represented each as a separate short parameter but Active-X controls have a limit and do not allow 22 parameters to be passed back in events. Because of this, the forwarding types and the private forwarding types are encoded into a BSTR parameter. The encoding format is the ASCII equivalent of the forwarding type separated by commas. The last entry is not followed by a comma. A length field is returned equal to the number of types.

<ASCII type>,<ASCII type>, . . . <ASCII type>

The control framework provided by Microsoft includes several methods which can be overridden to provide certain actions. The invention overrides the OnDraw( ) function to provide a bitmapped display for the control. In particular, the invention provides two bitmaps. One is used for toolbar type displays and one is used display when the control is inserted into an application.

The WindowProc( ) routine is where the messages are received and where link error conditions are handled. This routine uses FireLinkConnectionClosed( ).

The process__xxx routines handle the parsing of the incoming CSTA message. According to the invention, these routines handle the new CSTA messages, additional information and parameters that are to be passed in the ActiveX events described above.

As mentioned above, the invention supports ActiveX apartment threading. This is implemented via the following code:

BOOL

CCbCstaCtrl::CCbCstaCtrlFactory::UpdateRegistry (BOOLbRegister)

```
{
// TODO: Verify that your control follows apartment-model
threading rules.
// Refer to MFC TechNote 64 for more information.
// If your control does not conform to the
apartment-model rules, then
// you must modify the code below, changing the 6th
parameter from
// afxRegApartmentThreading to 0.
if (bRegister)
  return AfxOleRegisterControlClass (
  AfxGetInstanceHandle (),
  m__clsid,
  m__lpszProgID,
  IDS__CBCSTA,
  IDB__CSTA,
  afxRegApartmentThreading,
  __dwCbCstaOleMisc,
  __tlid
  __wVerMajor,
  __wVerMinor);
else
  return AfxOleUnregisterClass (m__clsid,m__lpszProgID);
}
```

Apartment threading allows multiple instances of a control within a single process. When instantiated in this manner, each instance of the control will attempt to form a separate connection with a Callbridge server. By using the server name and port properties on each control it is possible to have controls within the same process connects as different hosts connected to the same Callbridge server or different hosts connected to different Callbridge servers.

Property Pages

According to the invention, support has been added to collect a number of different statuses and statistics. All statuses and statistics to be kept are defined below and are displayable via new property pages. The purpose of these property pages are to provide methods for allowing a quick glance at items that show how the control interface is operating. These pages are mainly intended for support purposes. According to the presently preferred embodiment, four property pages are provided: the link status page, the statistics page, the error viewing property page, and the configuration property page.

The link status page includes the following information. For the Callbridge link:

1. Link Status—Connected or Not Connected,
2. Link Down Count—number of times link has been down, 3. Link Up Count—number of times link has been brought up.

For the Application link:

1. Link Status—Connected or Not Connected,
2. Event Acceptance State—Frozen or Unfrozen.

For heartbeat messages sent by Callbridge to the control interface:

1. Heartbeats Received—number of System Status Normals received from Callbridge CSTA,
2. Heartbeats Acked—number of heartbeat messages acknowledged.

For heartbeat messages sent to Callbridge from the control interface:

1. Heartbeats Sent—Number of System Status Normals sent to Callbridge CSTA,
2. Heartbeats Acked—number of heartbeat messages acknowledged,
3. Heartbeats Failed—number of heartbeat messages not acknowledged.

The link status property page has a Clear button that will clear all the above items except the Link Statuses and Event Acceptance State. According to the presently preferred embodiment, all items on the link status property page are updated every 10 seconds.

The statistics property page includes the following information:

1. CSTA Requests, responses, errors, rejects and events received,
2. CSTA Requests, responses, errors, rejects and events sent,
3. Messages per second received,
4. Messages per second sent.

The statistics property page has a Clear button that will clear all the above items. According to the presently preferred embodiment, all items on the statistics property page are updated every 10 seconds.

Before discussing the error viewing page, the error logging according to the invention will be discussed. According to the invention, internal errors may be sent to an application via events if the error the logging property is set to TRUE. In addition a simple error log is maintained.

The su_log_message( ) takes error message information and writes an ASCII representation to a circular file. This implementation has the following characteristics: The file has a fixed size. The file resides in the system directory. The file will is named CSTA_TSERVER_ERROR_LOG.LOG. The file will is viewable via a simple text editor. The file is viewable via the error log property page.

If error logging is implemented, a property page is provided that allows a user to view the error log. The error viewing property page has the following characteristics:

1. Error entries are displayed in a tree view format,
2. Error details are expandable/contractible,
3. A refresh button allows the display to be refreshed.

In addition, the following strings are used by the error viewing property page:

IDS CBCSTATSERVER PPG ERROR VIEW Error Viewing Property Page

IDS CBCSTATSERVER PPG ERROR VIEW CAPTION Error Viewing

The configuration property page provides an interface for setting and viewing all properties. This property page displays all properties and allows read/write properties to be changed. The following strings will be created for this property page.

IDS CBCSTATSERVER PPG CONFIG

IDS CBCSTATSERVER_PPG_CONFIG_CAPTION

There have been described and illustrated herein methods and apparatus for a control interface for CSTA protocols. While particular embodiments of the invention have been described, it is not intended that the invention be limited thereto, as it is intended that the invention be as broad in scope as the art will allow and that the specification be read likewise. It will therefore be appreciated by those skilled in the art that yet other modifications could be made to the provided invention without deviating from its spirit and scope as so claimed.

What is claimed is:

1. A control interface for linking a computer supported telephony application with a PBX switch utilizing CSTA protocols, said control interface comprising:

(a) a computing platform coupled to the PBX switch;

(b) a computer supported telephony application running on said computing platform; and (c) component based interface objects running on said computing platform, said component based interface objects defining properties, methods, and events, said properties, methods and events being mapped to control substantially every event and service of said PBX switch, wherein said computer supported telephony application controls substantially every event and service of said PBX switch via said component based interface objects;

wherein said component based interface objects is ActiveX;

wherein the control interface includes a heartbeat message manager, and heartbeat messages and replies are automatically generated.

2. A control interface according to claim 1, wherein ActiveX properties are mapped to session configuration.

3. A control interface according to claim 1, wherein ActiveX includes property pages and said property pages are mapped to session configuration.

4. A control interface according to claim 1, wherein ActiveX methods and events are mapped to startup and teardown a connection between said computer supported telephony application and the PBX switch.

5. A control interface according to claim 1, wherein substantially all CSTA and private data fields are supported.

6. A control interface according to claim 1, wherein the control interface includes an invoke ID manager, and invoke ID generation is automatic and configurable.

7. A control interface according to claim 1, wherein the control interface includes an invoke ID manager, and invoke ID timing is automatic and configurable.

8. A control interface according to claim 1, wherein said heartbeat messages and replies are configurable.

9. A control interface according to claim 1, wherein statuses and errors are automatically logged.

10. A control interface according to claim 9, wherein said statuses and errors are viewable via ActiveX property pages.

11. A method for linking a computer supported telephony application with a PBX switch utilizing CSTA protocols, said method comprising the steps of:

(a) coupling a computing platform to the PBX switch;

(b) running a computer supported telephony application on said computing platform; and (c) running component based interface objects on said computing platform, said component based interface objects defining properties, methods, and events, said properties, methods and events being mapped to control substantially every event and service of said PBX switch, wherein said computer supported telephony application controls substantially every event and service of said PBX switch via said component based interface objects;

wherein said component based interface objects is ActiveX;

wherein component based interface objects manage heartbeat messages, and heartbeat messages and replies are automatically generated.

12. A method according to claim 11, wherein ActiveX properties are mapped to session configuration.

13. A method according to claim 11, wherein ActiveX includes property pages and said property pages are mapped to session configuration.

14. A method according to claim 11, wherein ActiveX methods and events are mapped to startup and teardown a connection between said computer supported telephony application and the PBX switch.

15. A method according to claim 11, wherein substantially all CSTA and private data fields are supported.

16. A method according to claim 11, wherein component based interface objects manage invoke ID generation, and invoke ID generation is automatic and configurable.

17. A method according to claim 11, wherein component based interface objects manage invoke ID timing, and invoke ID timing is automatic and configurable.

18. A method according to claim 11, wherein said heartbeat messages and replies are configurable.

19. A method according to claim 11, wherein statuses and errors are automatically logged.

20. A method according to claim 19, wherein said statuses and errors are viewable via ActiveX property pages.

* * * * *